United States Patent [19]
Friedman et al.

[11] 3,876,438
[45] Apr. 8, 1975

[54] COMPOSITION FOR SELECTIVE PLUGGING OF WELLS

[75] Inventors: Robert H. Friedman; Julianne D. Krause; William R. Bradford, all of Houston, Tex.

[73] Assignee: Getty Oil Company, Los Angeles, Calif.

[22] Filed: Feb. 14, 1973

[21] Appl. No.: 332,428

Related U.S. Application Data

[62] Division of Ser. No. 152,277, June 11, 1971, Pat. No. 3,749,174.

[52] U.S. Cl. .................. 106/189; 61/36; 106/194; 106/197 C; 166/294
[51] Int. Cl. ...................... C08b 27/42; C08b 27/64
[58] Field of Search ............... 106/189, 194, 197 C; 61/36

[56] References Cited
UNITED STATES PATENTS
3,378,070  4/1968  Wessler .................. 106/194
3,749,174  7/1973  Friedman et al. .................. 166/294

*Primary Examiner*—Theodore Morris
*Attorney, Agent, or Firm*—Arnold, White & Durkee

[57] ABSTRACT

A composition is provided for use in selectively plugging water-rich strata of a subterranean formation so that the oil-to-water ratio of production will be increased, said composition including in preferred embodiments an aqueous solution of sodium carboxymethylcellulose, chromium potassium sulfate, and orthocresol.

Methods for selective plugging are provided which include injection of a selective plugging composition into subterranean formations having water-rich and oil-rich strata whereupon the material, after a significant period of time, assumes a much greater viscosity in the water-rich strata. Pretreatment and post-treatment options are provided for improving results under certain conditions.

7 Claims, 2 Drawing Figures

3,876,438

COMPOSITION FOR SELECTIVE PLUGGING OF WELLS

CROSS REFERENCE TO OTHER APPLICATIONS

This application is a division of our copending application Ser. No. 152,277, filed June 11, 1971, now U.S. Pat. No. 3,749,174.

BACKGROUND OF THE INVENTION

In the drilling and production of fluid mineral deposits such as petroleum oil and gas from subterranean reservoirs, the presence of water (usually in the form of an aqueous brine solution) has been a continuing problem. In almost every subterranean formation wherein either petroleum oil or gas is present in quantities which make production practical, water is also found to be present. Usually, certain portions or strata of an oil-bearing formation may be considered oil-rich, and other portions or strata of the formation may be considered water-rich. For definition purposes in this application, those portions or strata (hereinafter referred to as strata) containing more than about 45 percent oil will be termed "oil-rich," those containing less than about 30 percent oil will be termed "water-rich", and those having an oil concentration of between about 30–45 percent will be termed "mixed" strata. Examples of such strata are shown in the formation depicted in FIG. 1.

Production of connate water along with oil or gas from a producing formation is not desired for many reasons, among them being the extra production expenses encountered, the necessity for separation of the oil and water following production, and the fact that means must be provided for getting rid of undesired brackish water which is a pollutant to the surrounding terrain.

The problem is especially critical in those instances wherein a post-primary recovery process is employed which utilizes an aqueous driving fluid such as water (i.e., a waterflood operation) which is injected into the formation, as through an injection well. By the very nature of such processes, a relatively large amount of injected water will be produced at the producing well or wells. The focus of the problem in such situations thus shifts to that of producing enough oil along with the water (connate and injected) to make the process economical, and the recovery of available oil from the formation.

Especially in those situations wherein there is an extremely permeable zone in the formation which will literally "steal" well fluids from the surrounding zones (a so-called "thief zone"), an expensive waterflood process will do almost no good since the flooding medium will be channeled through the highly permeable thief zone and will not sweep the oil-rich portions of the formation.

The problem thus existing in those formations wherein there is a zone of very high permeability, a thief zone, is related to that existing in almost every formation due to more moderate permeability differences, and as described in the copending application of Friedman, Ser. No. 152,411. But the difference is actually one of kind rather than degree because of the completely different set of problems and possible solutions the thief zone presents to the operator.

The problem as set forth above and the many disadvantages encountered have been recognized by the oil and gas production industry for many years. Many, many efforts have been made to solve the problem in whole or in part to yield production at a more favorable oil-to-water production ratio and to provide for more complete recovery of available oil on subsequent waterflooding processes.

Generally speaking, there have been proposed by the prior art two basic approaches to solution of this problem. One such approach is to seal off the water-rich strata at or adjacent to the borehole, as by the use of Portland cement. This method has proved satisfactory in many instances, but is most unsatisfactory and completely impractical in others, especially in those formations wherein there is significant vertical permeability between the various strata.

The other approach suggested in the art is to selectively plug the more porous water-rich strata so that water from these strata will not be selectively produced or selectively swept by a flooding post-primary process, or at least so that the oil-to-water ratio is improved. It is to this latter general method, which has often been termed "selective plugging" by the art, that the present invention is directed.

There have been various solutions proposed by the prior art for selectively plugging the more porous water-rich strata. Some of the proposed solutions have been directed toward the formation of relatively impermeable barriers or the plugging of more permeable strata at specified locations in the formation, to provide for desired flow channels in fluid drive post-primary recovery processes. An example of this type of effort is described in the patent to Elfrink, U.S. Pat. No. 3,261,400. Others, such as Bail, U.S. Pat. No. 2,808,886, have utilized smokes to plug more permeable strata in connection with gas injection drives. Other proposals of the prior art have been directed to forming a thin barrier layer between oil and water strata from a precipitate formed by solutions introduced into the oil and water strata. This approach is illustrated by Bond U.S. Pat. No. 3,013,607. Still others have taken the approach of injecting into the well at fracturing pressures, a polymeric material which swells on contact with water, such approach being illustrated by West U.S. Pat. No. 3,181,612.

Others, exemplified by Maly U.S. Pat. No. 2,799,341, and Holbrook U.S. Pat. No. 2,787,325, have attempted to plug the water-rich strata after first heating the formation.

Still further approaches at solving this costly problem are illustrated by Nowack U.S. Pat. No. 2,714,929 and Dollarhide U.S. Pat. No. 3,181,611. Nowack proposes injection of a first solution which is miscible in oil, immiscible in water, into the formation whereupon a residual saturation is formed in the water strata. The well is allowed to produce whereupon the solution is depleted from the oil strata. Then a second water miscible, oil immiscible, solution is injected which reacts with the first solution to form a solid resin barrier in the water strata. Dollarhide injects a mixture which will preferentially set up in water zones and then removes that portion of the mixture which is unreacted after a certain period of time.

While many of the prior art methods may have been at least partially successful, and may have afforded at least partial solution to the problem in certain instances and under certain well conditions, the problem mentioned above still plagues the industry and remains today virtually as critical as ever. Indeed, with the rapid increase in production costs and the enforcement of pollution regulations by various governmental agencies, the industry is in very great need for a practical and inexpensive solution to this long-felt problem.

One of the primary difficulties with the prior art solutions as exemplified by the patents mentioned above, is their impracticality for use in most situations because of the expense involved. It must be remembered in connection with methods of this type that, typically, huge volumes of materials must be injected into the formations. Since the oil or gas which is produced is of limited value to begin with, and since production expenses are already high, any material injected into the well for selective plugging or for any other reason must, to be at all practical, be exceedingly inexpensive. Most of the methods of the prior art known to applicants entail the use of materials which are much too expensive to use in large volumes, in the typical situation encountered by the driller or operator.

Another primary problem with the prior art approaches as exemplified by those mentioned above is that although the term selective plugging has been widely used, its use has been imprecise since the fact is that the prior art methods have not been truly selective. The prior art methods of which applicants are aware would be more appropriately termed "preferential plugging" methods rather than selective plugging methods since despite optimistic predictions from many of those who have developed such methods, practice in the field has revealed that such methods have been impractical in most instances because the flow of oil, as well as water, has been impeded.

Many other less serious problems have been found to exist with the various prior art proposals. For example, in some instances exceedingly large pump pressures have been found necessary to inject the solutions proposed, in other instances the solutions have gelled or set up prematurely before reaching the areas of primary concern thus leaving the worst areas (such as thief zones in many cases) completely unplugged, and in still other instances it has proven impractical or too expensive to heat the well to the extent desired by some of the proposed solutions.

In every instance operators are naturally skeptical about injecting foreign matter which might have an adverse effect on the wells and even irreparably damage them.

So it remains that, to applicants' knowledge, despite the many efforts which have been made by those working in the art, and despite the great sums of money which have been spent to develop solutions, there is generally no practical and economical solution to this problem which is susceptible to use in most circumstances.

It would be desirable if selective plugging methods could be provided for well treatment which would be truly selective, allowing the same freedom of flow in the oil-rich strata as existed prior to the treatment.

It would be desirable if a selective plugging medium effective for use in such methods could be provided. And it would be desirable if such a medium could be provided which could be subject to excellent quality control, which would be easy to prepare, and which would be resistant to bacteria and ions present in the formation.

The present invention provides such a selective plugging medium.

SUMMARY OF THE INVENTION

A medium is provided which comprises in the preferred embodiments, about 0.20–0.23 percent sodium carboxymethylcellulose, 0.049–0.075 percent chromium potassium sulfate, and 0.05–0.06 percent ortho-cresol, for injection into subterranean formations to selectively plug the water-rich strata of such formations.

Such mediums may desirably be employed in selective plugging methods such as those described in our copending application Ser. No. 152,277, now U.S. Pat. No. 3,749,174, which generally include injection of such selective plugging medium into a formation through a borehole in the formation at a pressure exceeding the natural formation pressure. Upon injection of such plugging composition, and upon pumping it into both the oil-rich and water-rich strata of the formation, the composition will not significantly increase in viscosity in the oil-rich strata, but will gel and thus dramatically increase in viscosity in the water-rich strata after a period of time which is usually about one week.

Post-treatment, such as with dilute hydrochloric acid, may be undertaken if the permeability of mixed strata has been decreased to a level beyond that which is desired.

The well is then produced, desirably in conjunction with a waterflooding recovery process, and it will be noted that, upon production, the well fluids from the oil-rich strata flow as readily as ever into the borehole but flow of well fluids from the water-rich strata is effectively inhibited by the gelled selective plugging agent. Consequently, the production ratio of oil-to-water is greatly increased and a much larger percentage of the available oil is recovered.

BRIEF DESCRIPTION OF THE DRAWINGS

In order that the invention may be more fully understood, the invention will be described in part with reference to the accompanying drawings which form a portion of this specification, and wherein.

DESCRIPTION OF PREFERRED EMBODIMENTS

Figure 1:
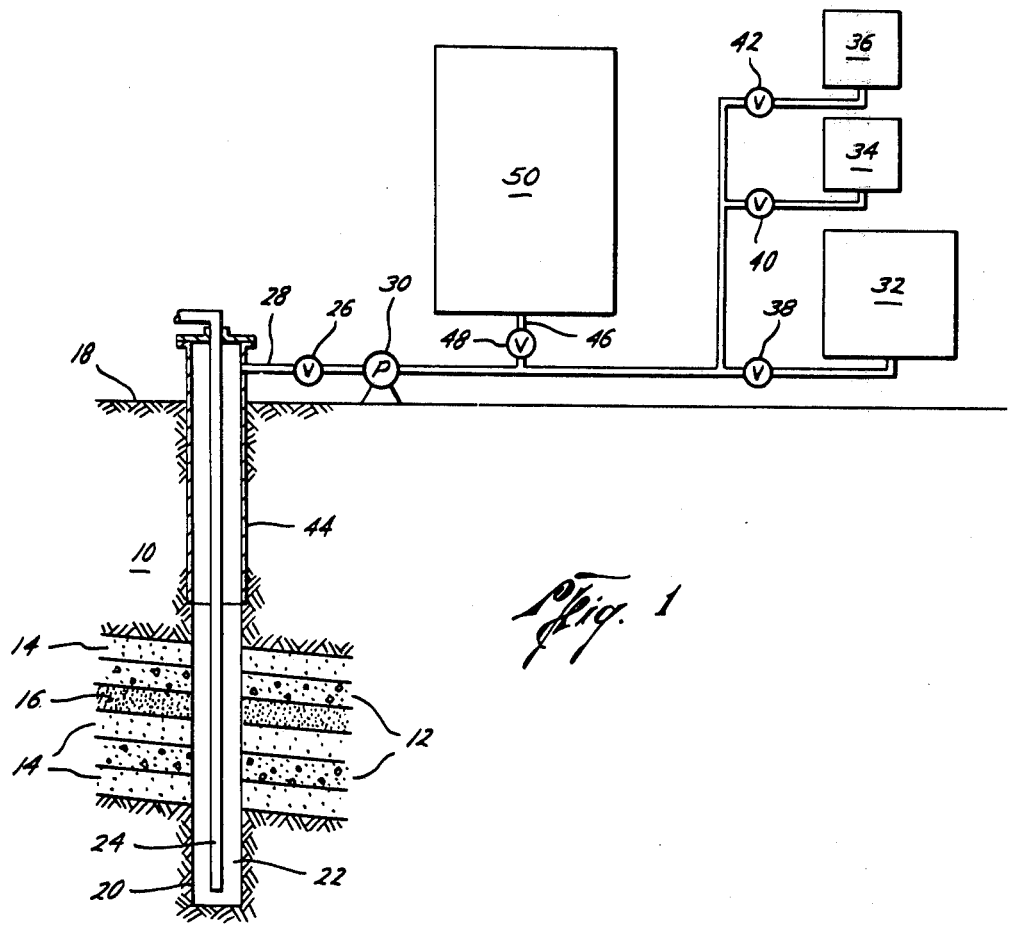
FIG. 1 is an elevational view illustrating a borehole penetrating a formation in which the present invention is useful.

In FIG. 1 there is illustrated a subterranean formation 10 having therein an oil reservoir which includes a plurality of generally horizontal strata of varying permeability, each stratum having a permeability within that stratum which is more or less constant. In this example are illustrated oil-rich strata 12 and water-rich strata 14, with one of the water-rich strata 16 being a thief zone because of its permeability which is much greater than that of the surrounding strata. The strata 14 will typically have a permeability that is significantly greater than that of the strata 12.

A borehole 20 penetrates the earth's surface 18 to a depth below the various strata indicated in FIG. 1. The borehole 20 typically includes a tubing 24 through which the well fluids are generally produced, an annulus 22 being defined between tubing and borehole. A casing 44 is typically provided to a point beneath the producing formations although in FIG. 1 the casing 44 has not yet been lowered to this depth and terminates at a point above certain of the strata illustrated.

Auxiliary equipment of any suitable type may be included at the earth's surface, that illustrated in FIG. 1 being only pictorially representative of suitable apparatus for use in connection with this invention. Such apparatus includes three tanks 32, 34, and 36 arranged in parallel and each joined through suitable flow control means such as the metered valves 38, 40, and 42 to a line 28 which is joined through the casing 44 to the annulus 22 between tubing and borehole.

Another line 46 joins to the line 28 a water tank 50, the line 46 having suitable flow control means such as the metered valve 48.

Master flow control means such as the valve 26, and pumping means such as the pump 30, are included in line 28, intermediate the line 46 and the junction of the line 28 with the casing 44.

The tanks may be of any suitable construction such as metal, but one of the tanks, in this embodiment the tank 34, is desirably coated with an inert material such as glass or a resinous material in a manner such that the metal will not be in contact with the fluid therein.

In accordance with the invention, a fluid mixture is provided which exhibits a much greater viscosity in water than in oil, and which exhibits that much greater viscosity only after a significant period of time. Such a fluid mixture is useful as the selective plugging medium of this invention, and comprises an aqueous solution of (1) a viscosity building agent, (2) a reactive agent which reacts with the viscosity building agent to increase the viscosity thereof, and (3) a delayed reaction catalyst.

More specifically, the viscosity building agent which applicants have found most particularly desirable is sodium carboxymethylcellulose (CMC). CMC is a synthetic cellulose gum containing 0.4 to 1.5 sodium carboxymethyl groups per glucose unit of the cellulose, and having a molecular weight of about 21,000 to about 500,000. CMC is a colorless, odorless, tasteless, nontoxic material which is readily dispersible in either hot or cold water, and is stable over a relatively large pH range of about 2–10. The viscosity of solutions of CMC vary widely dependent upon the number of hydroxyl radicals of the cellulose that have been etherified.

CMC is particularly useful in this context primarily because of its great capacity for viscosity increase, but also because it is relatively inexpensive and available, has no adverse side effects on the well, is relatively inert when produced with the oil, and reacts in a favorable manner with the other constituents as described below.

Useful as the reactive agent are +3 cations which will serve to cross-link the CMC, for example the +3 simple salts of iron, chromium and aluminum. Applicants believe the +3 salts of chromium such as chromic chloride [$CrCl_3$], chromic acetate [$Cr(C_2H_3O_2)_3H_2O$], chromic fluoride [$CrF_3.4H_2O$], and chromic sulfate [$Cr_2(SO_4)_3$], are especially useful for this purpose.

Particularly preferred by applicants as the reactive agent in accordance with the invention is chromium potassium sulfate (chrome alum), $CrK(SO_4)_2.12H_2O$.

In aqueous solutions of CMC, chrome alum acts to cross-link the CMC thereby increasing the size of the CMC molecules to form a gel, thus greatly increasing the viscosity of the CMC.

Since chrome alum is corrosive to steel tanks, it is preferred to store the chrome alum, until use, in a lined storage vessel such as the tank 34 illustrated in FIG. 1.

As the delayed reaction catalyst, it is necessary for practicality to select a compatible material which will delay the reaction for a time period of at least several hours and preferably several days. Useful as the delayed reaction catalyst in accordance with the invention, are bases and organic acids which have a high oil/water partition coefficient and a pK (negative log of ionization constant) value of greater than about 8.2. Especially desired are phenols having the high partition coefficient and a pK value of between about 8.2. and about 10.6. Examples of particular phenols which applicants believe to be especially useful are p-cresol, m-cresol, B-naphtol, phenol (benzophenol), and 3-nitrophenol.

Particularly preferred by applicants for use as the delayed reaction catalyst is ortho-cresol (or 2-methylphenol), $CH_3C_6H_4OH$. Ortho-cresol is a weak acid which acts as a base with respect to the chrome alum, i.e., a Bronsted Base. In the presence of CMC and chrome alum, it has been found that ortho-cresol will promote the reaction of the chrome alum with the CMC to increase the viscosity thereof, (depending upon conditions and concentrations, the reaction may not take place in the absence of a catalyst) but at the same time will delay that reaction for a significant time period. In the concentrations employed in the preferred embodiments of this invention, the reaction is delayed for a period of about seven to ten days.

Another desirable advantage of ortho-cresol is that it will attack native micro-organisms in the formation, such micro-organisms being effective in the absence of any enemy to attack the CMC and effectively reduce the viscosity thereof.

Delay in the reaction of chrome alum with the CMC in achieving a greatly increased viscosity of the CMC is of extreme importance and is a key feature of this invention. This delay allows time for the CMC solution to reach the most troublesome zones in the formation, including the thief zones. Also, it allows for the use of much lower pump pressures for the less viscous material than would be possible if premature gelling and viscosity increase of the CMC should result. Or, from a different viewpoint, it allows for the pumping of a much greater quantity of fluid at the same pump pressure. This is believed to be a feature of the invention which will make its use practical in many well situations.

The percentages of the various constituents employed as the selective plugging compositions of this invention have been found to be of extreme and critical importance. It has been found generally unsuitable to use in connection with this invention a CMC concentration in excess of about 0.3 percent. It has also been found that very small concentrations, less than 0.1 percent of each the reactive agent such as chrome alum and the delayed reaction catalyst, such as ortho-cresol, have proven satisfactory for use in the invention. For best results and most economical operation, a CMC content of from about 0.17 to 0.30 percent is preferred, and a concentration of from about 0.20 to about 0.23 percent is greatly preferred. An aqueous composition having such CMC content and from about 0.049 to about 0.08 percent (0.065 to 0.075 percent being particularly preferred at typical ambient conditions) chrome alum, and from about 0.035 to about 0.09 percent (0.05 to 0.06 percent being particularly preferred) ortho-cresol, has been found most useful to accomplish the objectives of the invention. If the chrome alum is stored in an unlined steel tank, its composition in the solution may desirably be slightly reduced from that specified above, and if within the specified range should be at the lower concentrations indicated. Also, the desired concentration of chrome alum will depend to some extent on the ambient temperature and the quality of the mixing water, the amounts given herein as exemplary and preferred relating to an ambient temperature of about 80°F and a mixing water that is of the type specified herebelow.

Not only is use of chrome alum in greater concentrations than that indicated herein as desirable, uneconomical because of the additional cost involved, but also use of chrome alum in concentrations exceeding about 0.1 percent stimulates too rapid increase in the viscosity for best results in most circumstances. Too much chrome alum will also result in precipitation but no gel.

The exact composition which is specifically preferred by applicants at the time of this application and believed by applicants to represent the best composition mode of their invention at such time, is about 0.21% CMC, about 0.07% chrome alum, and about 0.055% ortho-cresol, in aqueous solution. This composition will assume a very high viscosity in water-rich strata after about 7–10 days, but its viscosity in oil-rich strata will not significantly increase. Thus, the flow of fluids from water-rich strata will be effectively inhibited, and the oil-to-water production ratio upon water flooding dramatically increased.

Such a selective plugging composition, which has an initial viscosity at ambient temperature of about 15–20 centipoises, will assume a viscosity of about 3,000–6,000 centipoises after about 1 week in the water-rich strata of the formation.

The water used for mixing of the composition described above should generally be soft fresh water containing less than about 50 parts per million of calcium, and less than 20 parts per million of magnesium, since it has been found that larger amounts of calcium and magnesium will inhibit the viscosity buildup process. The effect of other cations may also be deleterious.

This preferred composition is quite inexpensive and a relatively small amount of the composition need be used because of the great viscosity afforded by the CMC after cross-linking thereof. At the present time, a fluid of this composition may be obtained in leading oil producing areas of the U.S. for just a little over 60 cents per barrel.

In addition, the fluid of this composition will not set up in oil-rich strata wherein the oil concentration is greater than about 45 percent. If the oil concentration in a stratum is between about 30 percent and about 45 percent (mixed strata) the selective plugging medium described above will reduce the permeability of the stratum although it will not completely plug that stratum. If it is not desired that the permeability of the mixed strata be reduced, remedial work can be done on such strata after completion of the injection, the remedial work including simply the injection into such strata of a dilute solution of hydrochloric acid. Action of the HCl will increase the permeability and restore these strata to the condition existing before treatment with the selective plugging medium.

If the oil concentration of a stratum is less than 30% (water-rich strata) the stratum will be substantially completely plugged by the selective plugging medium described above in the preferred embodiment.

In accordance with the preferred method embodiments of this invention, an aqueous solution of CMC is desirably stored in the tank 32 at or adjacent the well site. Similarly, an aqueous solution of chrome alum is retained in the lined storage tank 34, and an aqueous solution of ortho-cresol is retained in the storage tank 36. Fresh soft water having a calcium content of less than 50 parts per million and a magnesium content of less than 20 parts per million is retained in the storage tank 50.

Each of the storage tanks 32, 34, 36, and 50 has metered flow control means into the line 28 so that a measured amount of each material may be introduced into the line 28.

A selective plugging medium is thus provided by metering into the line 28, sufficient CMC, chrome alum, ortho-cresol and fresh water to form a composition having the desired percentage ranges set forth above.

It will be recognized that the illustration of the tanks 32, 34, 36, and 50 and their associated metered valves is by way of illustration only, and the selective plugging medium as specified above may actually be more conveniently made as a batch in a large tank or vat, or in any other convenient way.

The selective plugging medium thus formed is pumped through the line 28 into the annulus 22, and the pressure in annulus 22 is allowed to build up to a point such that the formation pressures in at least the water strata are exceeded. The selective plugging medium is thereupon injected into the strata 12, 14, 16 at a temperature of less than 120°F. It has been found that gellation due to cross-linking of the CMC molecules will not occur at temperatures greatly in excess of 120°F, and it is presently believed that 120° represents the maximum temperature at which this process is currently feasible. This therefore prevents the use of this method in very high temperature wells.

Production is then begun, desirably in conjunction with water or other aqueous fluid as a driving medium from one or more injection wells, whereupon the oil-rich strata will be swept with great efficiency.

The well or wells utilized for injection of the selective plugging medium may be either injection wells or producing wells, depending, among other factors, upon the portion of the formation which it is desired to affect.

Although others may prefer more frequent use, applicants anticipate that the above procedure will be a one-shot treatment procedure which may be completed within a very short period of time, e.g., 2 days, prior to initiating or resuming production in conjunction with a waterflood recovery process.

Applicants have performed some working examples to illustrate the effectiveness of the invention, and the selectivity of the plugging medium employed, but such examples which are here described should not be considered as limiting the invention.

EXAMPLE I

Two glass columns, designated tubes No. 1 and No.

2, each three inches in diameter and four feet long, were arranged in parallel with the injection ends thereof connected to allow communication therebetween. Each tube was packed with sand; permeability of the sand in tube No. 1 was 7.2 darcies, and the permeability of the sand in tube No. 2 was 1.0 darcy. Tube No. 1 was charged with 2,000 cc. fresh water. Tube No. 2 was charged with 1,500 cc. of oil and 500 cc. of water, the oil being crude oil from the McElroy field in West Texas and having a viscosity of about 7–8 centipoises, and the water being tap water.

Food coloring was added to a supply of fresh water, and 2,000 cc. of the colored water was injected. It was observed that such water entered only Tube No. 1, the high permeability water saturated tube.

A selective plugging medium solution was prepared in soft fresh water, the solution containing 0.21% CMC, 0.07% chrome alum, and 0.055% ortho-cresol. 1,800 cc. of this fluid was then injected and it was observed that this fluid completely filled Tube No. 1 and about 100 cc. entered Tube No. 2.

Ten days later, 1,600 cc. more water was injected. By this time, Tube No. 1 was completely plugged. Only oil was produced until water breakthrough finally occurred in Tube No. 2.

EXAMPLE II

Another example similar to Example I was conducted, except that in this instance the tube sizes were different. In this example, the oil-filled tube was three inches in diameter and two feet long, while the more porous water zone (corresponding to a thief zone) was one inch in diameter and two feet long.

Upon injection of colored water, it was observed that the colored water completely displaced the water in the small tube.

Upon injection of 400 cc. of the selective plugging medium of Example I, the medium completely displaced the colored water in the smaller tube. The selective plugging medium invaded about one-fourth of the larger tube, displacing oil.

Five days later, the final waterflood with colored water was begun, and, as in Example I, only oil was initially recovered. The recovery of oil in this example was at a lower rate than in Example I, since the oil sand had been penetrated to a sufficient extent to cause some gelling of the plugging medium. Accordingly, to remedy the restriction to permeability caused thereby, a dilute solution of .1N hydrochloric acid [0.3% acid], was injected. This solution did not affect the tight plug in the smaller tube, but it was effective to remove the barrier in the oil zone, and production quickly increased (at the same pressure) to a level three times that which had been previously observed.

Figure 2:
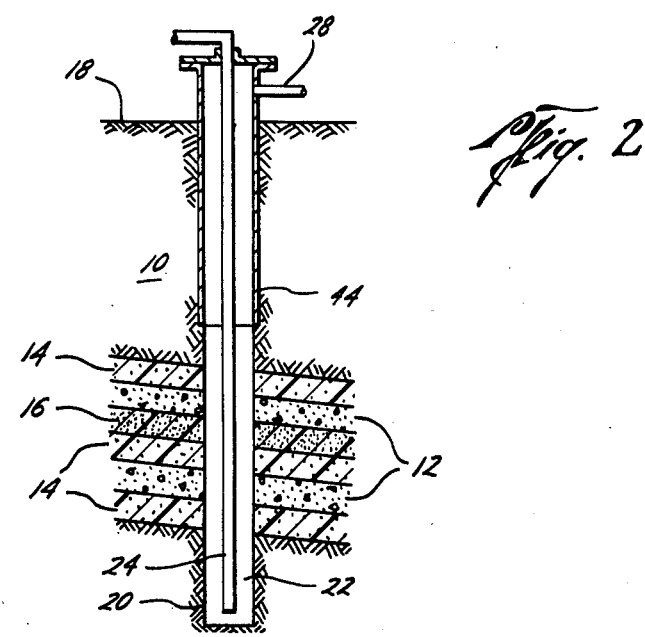
FIG. 2 is a view similar to FIG. 1, illustrating the status of strata of the formation after performance of a method in accordance with the invention.

FIG. 2 illustrates the formation 10 some ten days after the performance of the method as above described. It will be seen that the water-rich strata including specifically the thief zone 16 are plugged, while well fluids are free to flow through the oil-rich strata to the borehole to be produced, thereby greatly increasing the oil-to-water production ratio.

It is believed that the viscosity of the selective plugging medium in the water-rich strata will increase, perhaps rather dramatically, after the first three or four weeks. While this is of no great value since the relative permeabilities at this point will already be significantly different between oil-rich and water-rich strata, neither is it of any real harm.

One potential problem in some instances is the fact that sand will generally accelerate the gellation rate of the selective plugging medium of the invention, since the sand provides a negatively charged surface acting as a Lewis base. [Any base will accelerate the gellation rate.]

Two ways were found to overcome this potential problem. The first is to assure that pumping is continuous to keep the fluid in motion, since it is extremely thixotropic. The other is to initially inject into the formation, prior to injection of the selective plugging medium, a dilute aqueous cationic solution to neutralize the negatively charged sand particles. If this procedure is utilized, the initial injection is desirably followed by injection of a buffer zone of plain fresh water prior to injection of the selective plugging medium.

Although any suitable cationic agent may be employed for this type of pretreatment, particularly preferred for such use is chromium potassium sulfate, expecially if the chrome alum is present anyway for utilization in the selective plugging medium. 0.03% chrome alum solution is useful for this purpose.

It is recognized that the plugs formed by this invention in the water-rich strata of the formations will not last forever. Applicants believe that such plugs should be effective for a period, under typical well conditions, of approximately 2 years. Of course it would be advantageous if a plug could be provided which would last much longer. But applicants believe that current economic conditions are such, and are likely to remain such, that a plug effective for a two year period will prove to be a great advantage to operators in many or most instances.

One distinct advantage provided by this invention is that the operator does not have to be overly concerned about the specific location in the formation which will be occupied by the selective plugging medium provided. He can be assured that the selective plugging medium will seek the more porous water-rich portions of the formation and to the extent that it does encounter oil-rich portions, it will not significantly affect those portions of the formation. And if it should affect certain portions such as mixed strata, the situation can be readily remedied by simple post-treatment as mentioned above.

Although the discussion herein has been primarily in terms of oil and water, it will be recognized, as was indicated in the introduction, that those terms as used both in the specification and in the following claims should be given their broad construction to include aqueous solutions, such as brine, and other naturally occurring fluid minerals such as natural gas, although the primary context of use of the invention is expected to be in connection with the production of petroleum oil.

All percentage figures given above are by weight. The liquid constituents have specific gravities so near 1.0 that the percentages given are actually operable regardless of whether reference is made to weight percent or volume percent. Solids would of course be expressed in terms of weight percent.

Although the invention has been described in terms of particularly useful and preferred embodiments which represent the best mades known to applicants at the time of this application, it will be apparent that changes can be made in the compositions and methods described in this specification without departing from the scope of the invention as described in the following claims.

We claim:

1. A composition of matter useful for selectively plugging water strata in subterranean formations, comprising in aqueous solution from about 0.17% to about 0.30% by weight sodium carboxymethylcellulose, a reactive agent which reacts with the sodium carboxymethylcellulose to increase the viscosity thereof in the presence of water, said reactive agent being selected from the group consisting of the +3 simple salts of iron, chromium, and aluminum, and a delayed reaction catalyst which is effective to promote the reaction of said reactive agent with said sodium carboxymethylcellulose but is also effective to delay said reaction for several days, said delayed reaction catalyst being selected from the group consisting of o-cresol, p-cresol, m-cresol, B-napthol, phenol, and 3-nitrophenol.

2. A composition of matter in accordance with claim 1, wherein said reactive agent is selected from the group consisting of chromic chloride, chromic acetate, chromic fluoride, and chromic sulfate.

3. A composition of matter in accordance with claim 1, wherein said reactive agent is chromium potassium sulfate.

4. A composition of matter in accordance with claim 1, wherein said delayed reaction catalyst is ortho-cresol.

5. A composition of matter useful for selectively plugging water strata in subterranean formations, comprising in aqueous solution from about 0.17 to about 0.30 percent by weight sodium carboxymethylcellulose, from about 0.049 percent to about 0.08 percent by weight chromium potassium sulfate, and from about 0.035 to about 0.09 percent by weight ortho-cresol.

6. A composition in accordance with claim 5, wherein the concentration of said sodium carboxymethylcellulose is from about 0.20 to about 0.23 percent by weight, the concentration of said chromium potassium sulfate is from about 0.049 to about 0.075 percent by weight, and the concentration of said ortho-cresol is from about 0.05 to about 0.06 percent by weight.

7. A composition of matter useful for selectively plugging a water strata in subterranean formations in accordance with claim 5, comprising in aqueous solution about 0.21 percent by weight sodium carboxymethylcellulose, about 0.07 percent by weight chromium potassium sulfate, and about 0.055 percent by weight ortho-cresol.

* * * * *